United States Patent [19]

Wener et al.

[11] Patent Number: 4,516,227
[45] Date of Patent: May 7, 1985

[54] SUBOCEAN BOTTOM EXPLOSIVE SEISMIC SYSTEM

[75] Inventors: Kenneth R. Wener; Anthony R. Tinkle, both of Littleton, Colo.

[73] Assignee: Marathon Oil Company, Findlay, Ohio

[21] Appl. No.: 327,315

[22] Filed: Dec. 4, 1981

[51] Int. Cl.³ ............................................. G01V 1/38
[52] U.S. Cl. ......................................... 367/15; 367/4; 181/110
[58] Field of Search .......................... 367/15, 19, 3, 4; 340/566; 181/110, 140, 400–402; 324/323

[56] References Cited

U.S. PATENT DOCUMENTS

| 56,623 | 7/1866 | Shepard . | |
|---|---|---|---|
| 695,068 | 3/1902 | Mangold et al. . | |
| 2,324,387 | 7/1943 | Flude | 181/110 |
| 2,422,337 | 6/1947 | Chilowsky | 367/4 |
| 2,590,531 | 3/1952 | McLoad | 367/15 |
| 2,691,939 | 10/1954 | Hintze | 181/110 |
| 2,717,656 | 9/1955 | Bannister . | |
| 2,729,300 | 1/1956 | Pasley et al. | 181/110 |
| 3,078,931 | 2/1963 | Moore . | |
| 3,212,600 | 10/1965 | Hensley | 367/15 |
| 3,373,400 | 3/1968 | Epstein et al. . | |
| 3,561,546 | 2/1971 | Craig . | |
| 3,772,639 | 11/1973 | Snyder | 367/4 |
| 3,931,453 | 1/1976 | Hall, Jr. . | |
| 4,138,658 | 2/1979 | Avedik et al. | 181/110 |
| 4,186,373 | 1/1980 | Thompson | 367/15 |
| 4,358,834 | 11/1980 | Swenson | 367/4 |
| 4,372,420 | 2/1983 | White | 181/110 |

OTHER PUBLICATIONS

Steinmentz et al, "Sail Coupling of a Strong Motion Ocean Bottom Seismometer", 5/3/79, pp. 2235-2250, Offshore Tech. Conf., Houston, Texas.

Primary Examiner—Nelson Moskowitz
Attorney, Agent, or Firm—Jack L. Hummel

[57] ABSTRACT

The invention provides a system having at least one subocean bottom seismic device, such as a seismic source (10) or a seismic detector (600), and a planting unit (300). When the planting unit (300) is lowered it selectively implants the seismic device at predetermined locations in the ocean bottom, it releases from the implanted seismic device, and, when raised, uncoils a signal cable (30) from the implanted seismic device. The signal cable (30) which is capable of retrieving the implanted seismic device (10, 600) is connected to an anchored buoy (40) which contains a first communications unit (70). A second seismic device (100) is carried in a predetermined pattern near the implanted seismic device and is connected to a second communication unit (130).

3 Claims, 11 Drawing Figures

Fig. 11

SUBOCEAN BOTTOM EXPLOSIVE SEISMIC SYSTEM

FIELD OF INVENTION

This invention relates to a system for implanting seismic devices into subocean bottom sediments below the mudline.

BACKGROUND OF ART

Several conventional techniques are employed for seismic analysis of the strata below the bottom of the ocean. Further, the U.S. Geological Service has ruled that seismic sources cannot be detonated so as to unduly disturb the bottom of the ocean. Hence, prior art approaches currently used provide for explosions to occur above the bottom of the ocean and below the bottom of the ocean. For example, drilling rigs are used to drill holes several hundred feet deep so that explosive charges can be placed therein for generation of the seismic source signal. Likewise, in shallow areas, poles are used to implant explosive seismic charges in the soft sediments below the mudline of the ocean bottom. These two prior art approaches are expensive and time consuming. Such approaches, however, are accurate in that they precisely place the seismic source according to a survey technique.

Other conventional approaches relate to exploding seismic charges above the bottom of the ocean so as not to disturb the bottom. Other prior art approaches involved dropping time fused and weighted explosive charges over the side of the boat. With these approaches, however, the time and location of the explosion is not known with the necessary precision for seismic exploration.

Likewise, other prior art approaches use seismic detectors on or near the ocean bottom. For example, the seismic detector can be pulled along in the ocean water, or it can be placed on the bottom of the ocean and anchored thereto by some sort of buoy and anchoring system. Drilling holes, however, to insert detectors into the ocean bottom, although used on land, have not been used extensively in the ocean.

A search of the prior art was made and the following patents were uncovered:

| Inventor | U.S. Pat. No. | Issue Date |
| --- | --- | --- |
| C. Shepard | 56,623 | July 24, 1866 |
| J. Mangold et al | 695,068 | March 11, 1902 |
| C. E. Bannister | 2,717,656 | Sept. 13, 1955 |
| D. G. Moore | 3,078,931 | Feb. 26, 1963 |
| S. Epstein et al | 3,373,400 | March 12, 1968 |
| Calvin B. Craig | 3,561,546 | Feb. 9, 1971 |
| Hall, Jr. | 3,931,453 | Jan. 6, 1976 |

The search was directed to devices for implanting seismic devices into the ocean's bottom.

The 1866 patent issued to Shepard (U.S. Pat. No. 56,623) sets forth a well tube and an apparatus for driving or sinking it into the ground. A number of weights are utilized around the tube to provide weight to the tube. The tube is then turned and the weight causes the tube to enter the ground.

The 1902 patent issued to Mangold et al (U.S. Pat. No. 695,068) relates to an apparatus for obtaining deposits from the beds of rivers and the like. A weight is utilized on a guide rod which is affixed to a tube-shaped deposit container. The apparatus is lowered off the side of the boat and, because of the appended weight, engages the ground to obtain samples. The apparatus is then returned to the boat.

The 1955 patent issued to Bannister (U.S. Pat. No. 2,717,656) relates to an apparatus for seismic exploration wherein an aircraft is utilized to lower a tube-shaped penetrating tool. The tool has a weighted head and is dropped from a sufficient elevation to impact and penetrate the ground surface.

The 1963 patent issued to Moore (U.S. Pat. No. 3,078,931) relates to an apparatus for extracting earth core samples from the ocean floor. The Moore apparatus is dropped into the ocean and automatically descends to the ocean's floor, extracts the sample core, and returns to the surface of the ocean to be picked up. The core apparatus includes a weighted core cutting tube which is expendable and once implanted in the ocean floor is not retrieved. The core sample, however, is returned with the remaining portion of the core.

The 1968 patent issued to Epstein et al (U.S. Pat. No. 3,373,400) relates to an apparatus for determination of the geophysical properties of the sea bottom. A sediment probe instrument is dropped into the ocean. The probe is designed to orient itself and to penetrate into the sediment of the ocean bottom a predetermined distance. An explosive charge is placed at the bottom of the probed portion for selective detonation. Additionally, once the probe is implanted, a float is disengaged to rise and to uncoil a cable contained within the probe. Disposed along the cable are a number of explosive charges which are placed between the float and the top of the implanted probe. A timer contained within the probe causes the explosive charges to be selectively detonated. The first charge releases the float and causes the second charge to fall to the mudline of the sea bottom. The second charge is then detonated. Finally, a third detonation pulse is emitted to detonate the explosive charge implanted in the sea sediment.

The 1971 patent issued to Craig (U.S. Pat. No. 3,561,546) sets forth an apparatus for underwater geochemical prospecting by taking samples from submerged areas. A weighted probe is set forth which impacts the bottom of the submerged area to permit the taking of the sample. The probe can then be recovered and the sample removed.

The 1976 patent issued to Hall, Jr. (U.S. Pat. No. 3,931,453) relates to an improved cable anchor case.

DISCLOSURE OF INVENTION

The problem faced in designing a system for implanting seismic devices into subocean bottom sediments below the mudline is to formulate a system that utilizes an implanting apparatus which can implant and anchor one or a plurality of seismic devices according to a survey, can selectively activate the implanted seismic devices, and, if necessary, can retrieve the implanted seismic devices.

The seismic implanting system of the present invention provides a solution to the problem and includes at least one subocean bottom seismic device, such as a seismic source or a seismic detector and a planting unit when lowered for selectively implanting the seismic device at predetermined locations, for releasing from the implanted seismic device, and when raised for uncoiling a signal cable from the implanted seismic device. The signal cable being capable of retrieving the implanted seismic device is then connected to an anchored buoy which contains a first communication unit. A second seismic device is carried in a predetermined pattern near the implanted seismic device and is connected to a second communication unit. A control unit is interconnected with the first and second units for controlling the generation and reception of seismic signals between the first and second seismic devices.

In comparison to the prior art approaches, including the results of the patent search, none of the prior techniques set forth a system of using separate apparatuses for individually implanting and retrieving seismic devices (whether seismic sources or seismic detectors) at precise locations in the subocean bottom sediments and for individually activating the seismic devices at precise times.

GENERAL DESCRIPTION OF FIRST PREFERRED EMBODIMENT

Figure 1:
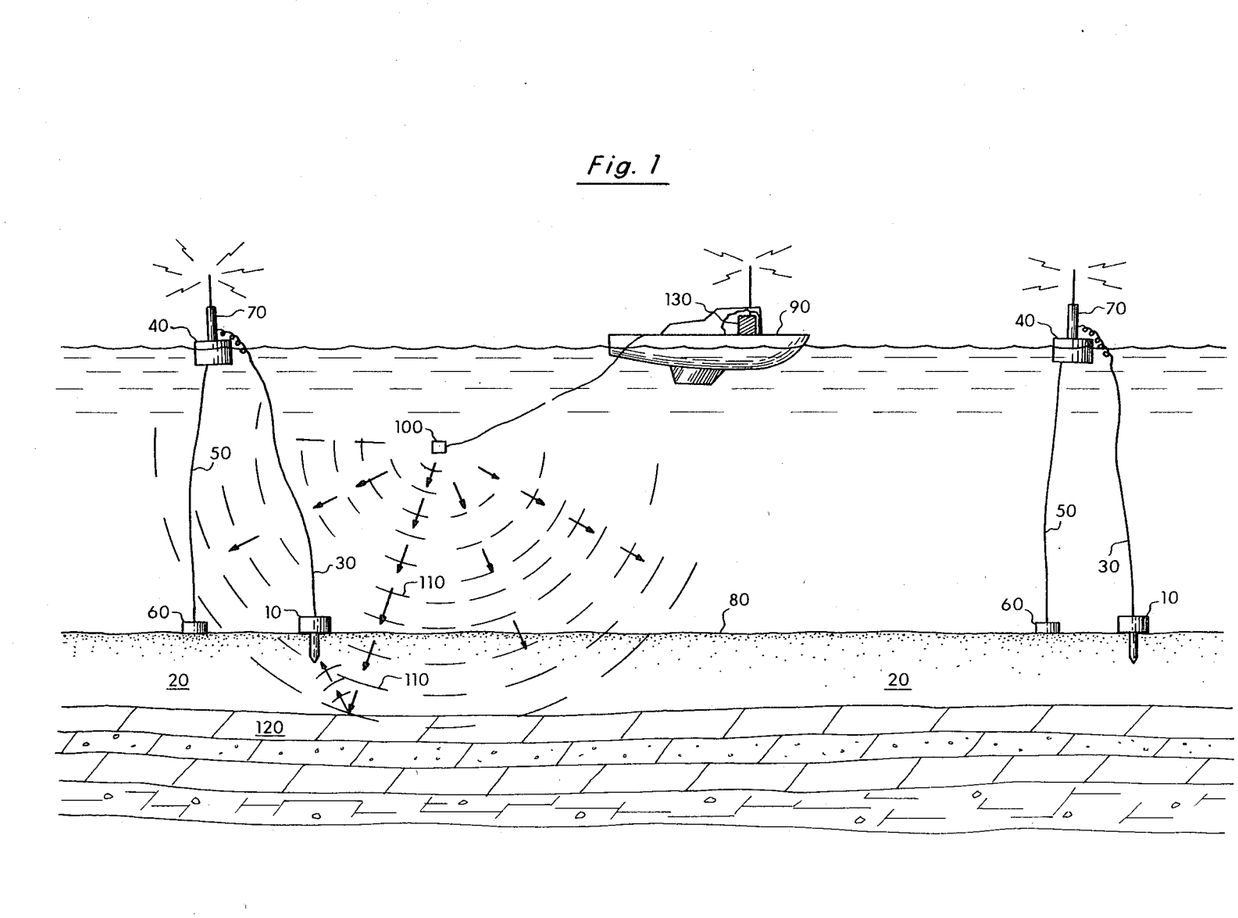
FIG. 1 is an illustration of a first embodiment of the present invention showing a seismic detector implanted in the subocean bottom at a predetermined location.

In FIG. 1, the general operation of the first embodiment of the present invention is illustrated. A number of subocean bottom seismometers 10 of the present invention are implanted into the ocean bottom sediment 20 a predetermined distance. A signal cable interconnects the subocean bottom seismometer 10 with a signal buoy 40 which in turn is interconnected by means of a cable 50 to an anchor 60. Signals to and from the signal buoy occur by radio transmission from a data transmission unit 70. As shown in FIG. 1, an anchor 60 and the upper portion of the subocean bottom seismometer rests on the mudline 80 of the ocean bottom sediment 20.

A boat 90 pulls a seismic source 100 in a predetermined pattern around the implanted subocean bottom seismometer. The seismic source 100 is selectively activated to impart seismic waves 110 into the ocean wherein the seismic waves are reflected from substrata or earth formations 120 and back into the subocean bottom seismometer 10. When the subocean bottom seismometer 10 detects the reflected seismic waves 110, the data transmission unit 70 sends a radio wave to a data receiving unit 130 located in the seismic source boat 90.

By utilizing a large number of implanted subocean bottom seismic units, a single boat 90 pulling the seismic source 100 can effectively locate and determine the nature of the strata 120.

Figure 2:
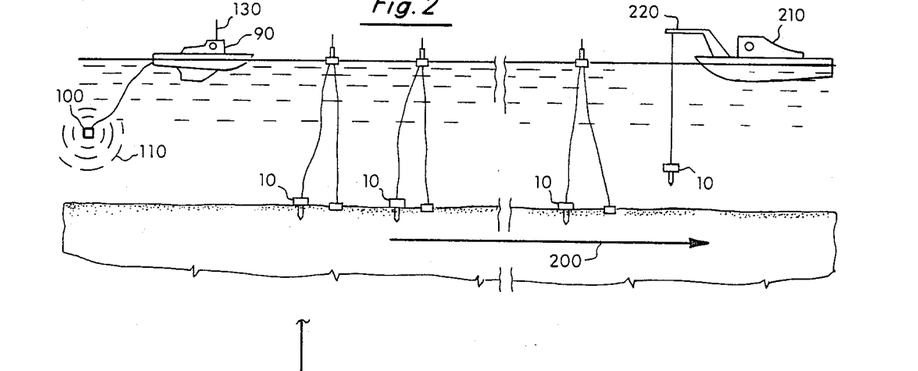
FIG. 2 sets forth an illustration of the embodiment shown in FIG. 1 showing a number of seismic detectors implanted along a recording line in the ocean.

In FIG. 2, a number of subocean bottom seismometers 10 are implanted along a recording line 200. An implanting boat 210 utilizing a crane 220 selectively implants subocean bottom seismometers 10 at precise physical locations. The subocean bottom seismometers are preferably implanted 50 to 300 feet apart along the recording line. Typically, 48 or 96 subocean bottom seismometers 10 are implanted and the implant time is approximately 15 to 30 minutes depending upon the depth.

In conventional seismic exploration, the seismometer is placed on the bottom and is anchored and supported thereto. However, conventional seismometers do not penetrate the soft sediment 20 and, hence, the soft sediment 20 acts as an antennuator to the reflected seismic signal 110 from the strata 120. Under the teachings of the present invention, a seismometer can be implanted into the subocean sediment 20 to depths in the vicinity of 5 to 25 feet thereby minimizing the antennuations of the signal. As will be more fully discussed, the implanted subocean bottom seismometer can be recovered and reimplanted in a new location by boat 210.

DETAILED DESCRIPTION OF THE FIRST EMBODIMENT

Figures 3, 4, 5:
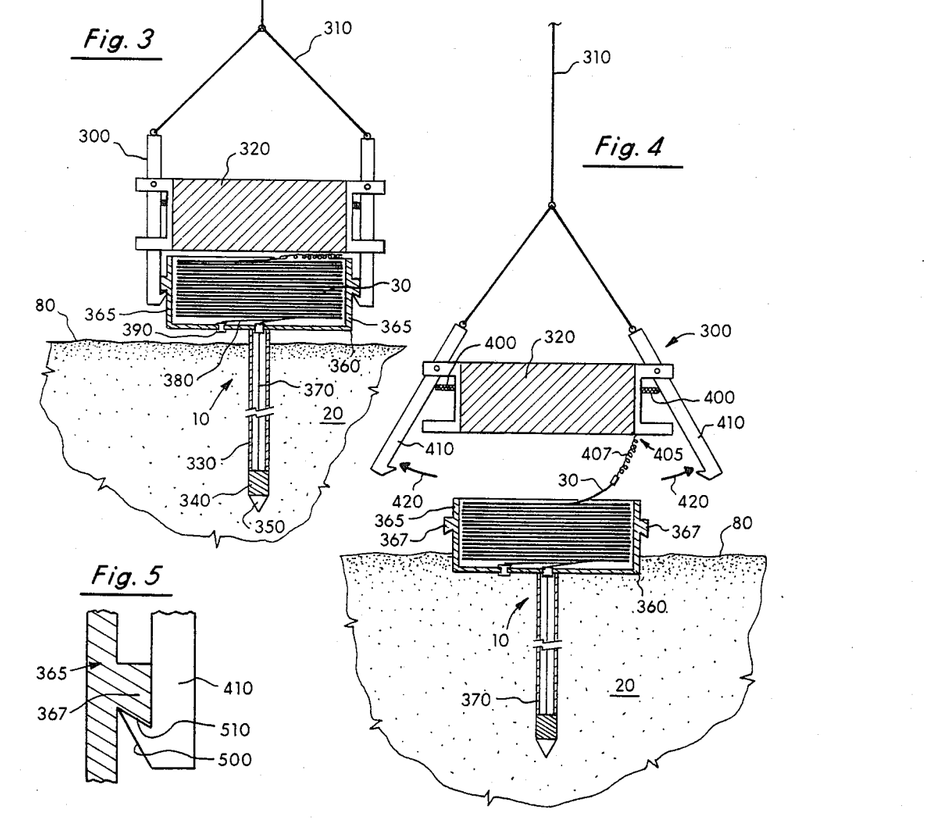
FIG. 3 sets forth, in cross-section, a seismic detector being implanted by a planting unit of the present invention.
FIG. 4 shows, in cross-section, the planting unit of FIG. 3 releasing from the implanted seismic detector.
FIG. 5 illustrates in partial cross-section the details of the release mechanism of the present invention.

In FIGS. 3 and 4, the implanting of a single subocean bottom seismometer 10 is shown. The planting unit 300 is suspended by means of a support cable 310 from the crane boat 220 and carries the subocean bottom seismometer 10. As the planting unit 300 is lowered by the crane boat 210, the subocean bottom seismometer 10 unit is implanted through the mudline 80 and into the sediment 20. The planting unit carries a heavy weight 320 (for example 1500–2000 pounds in the preferred embodiment) which is sufficient weight to implant the tube 330 of the subocean bottom seismometer unit 10 five to twenty-five feet into the sediment 20. The seismic detection package 340 is located at the lower end of the tube 330.

In the preferred embodiment, the tube 330 is four inch diameter steel tubing and the seismic detector is a conventional hydrophone. Below the hydrophone 340 is mounted a tapered solid steel insertion point 350 in the form of a cone. The tube 330 is connected to a cylindrically shaped steel container 360 which contains the signal cable 30 coiled therein. The signal cable 30 contains an electrical cable 370 combined with a stress cable 380. The stress cable is connected at one end to container 360 at point 390.

It is to be expressly understood that although a cylindrically shaped container 360 is shown in FIGS. 3 and 4, a rectangular container could be utilized wherein it contains an internal cylindrically shaped chamber for the signal coil cable 30. As mentioned, the signal cable 30 includes the combination, in a single cable, of the stress cable 380 and the electrical signal cable 370. In the preferred embodiment, approximately 600 feet of signal cable 30 is stored within the cylindrical chamber 360.

After the subocean bottom seismic unit 10 has been planted, the support cable 300 goes slack and release springs 400 activate to cause the pair of holding arms 410 to move outwardly in the direction of arrow 420 and to release from the subocean bottom seismometer unit 10.

In operation, therefore, and as illustrated in FIGS. 3 and 4, after the planting unit 300 implants the subocean bottom seismic unit 10, the cables 310 go slack. When cables 310 go slack, the release springs 400 operate on the arms 410 to release the holding arms 410 from the subocean bottom seismic unit 10. The release mechanism will be discussed subsequently.

In the embodiment shown in FIG. 3, the container 360 is cylindrical in shape and can be constructed from material such as steel. The tube 330 is centrally located on the bottom surface of the container 360 and is also made from steel and can be affixed to the container by conventional means such as welding. On opposing sides of container 360 are holding brackets 367 which engage the holding arms 410.

The relationship between the holding arm 410 and the catch 357 is set forth in FIG. 5 wherein the holding arm 410 terminates in a locking member 500. Locking member 500 is substantially triangular in shape and is inclined upwardly to mate with the bottom surface 510 of the catch 367. Hence, in operation, as the planting unit 300 carries the subocean bottom seismometer unit 10 downwardly, the inclined surface 510 of the catch 367 engages the locking member 500 to mate each other and to firmly hold the subocean bottom seismic unit 10. However, when unit 10 is implanted, the cable 310 becomes slack and the pressure between surfaces 510 and 500 becomes minimal thereby enabling the release spring 600 to disengage the locking member 500 of the catch 367. There is a small gap between the planting unit and the container 360 to permit the holding arm to travel downwardly during implantation to provide disengagement of locking member 500 from catch 357.

It is to be expressly understood that other types of release mechanisms can be utilized. For example, a screw motor could be placed within the weight 320 and could operate a screw shaft to selectively move in and move out the release or holding arms 410. Such a configuration could sense when the cable 310 becomes slack and upon slackening of the cable, the screw arms would be activated to release the holding arms 410. This type of structural arrangement would be beneficial in situations where the holding arm 410 is actually embedded in the very soft mud or bottom sediments.

Upon release, as shown in FIG. 4, the signal cable 30 is uncoiled from container 360 and is pulled upwardly as the crane 220 retrieves the planting unit 300. When the planting unit 300 is returned to the boat 210, the signal cable 300 is removed from the planting unit at point 405 and is affixed to the signal buoy 40 and to the data transmission unit 70. A flex-cord 407 is utilized at the upper end of the signal cable 30 in order to provide tension release for the signal cable 30 as the planting unit 300 is returned to the boat 210.

When it is desired to move the subocean bottom seismometer unit 10 to another location, the boat 210 travels to the buoy 40 and retrieves the buoy 40 and its associated anchor 10 and then pulls the subocean bottom seismometer unit 10 upwardly by means of signal cable 30. When this occurs, the steel cable 380 portion of the signal cable 30 supports the weight of the unit 10 as well as the necessary stress required to pull the unit 10 from the implanted position. In this fashion, unit 10 can be retrieved for implantation to a new location.

GENERAL DESCRIPTION OF SECOND PREFERRED EMBODIMENT

Figure 6:
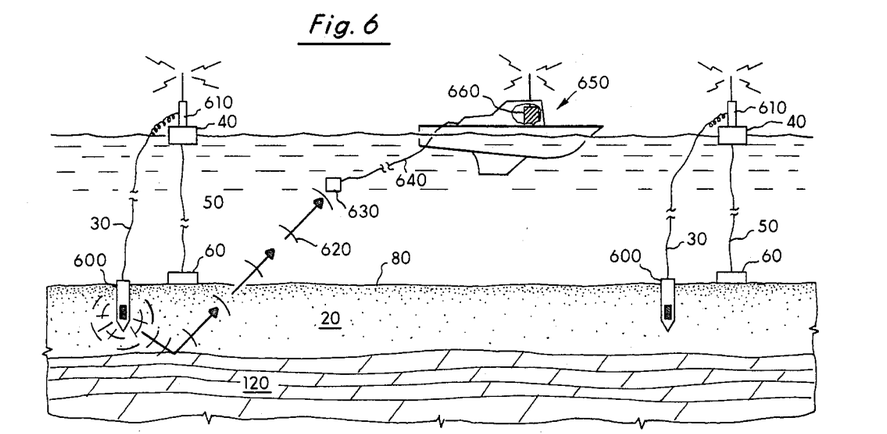
FIG. 6 illustrates a second embodiment of the present invention using implanted seismic sources.

In FIG. 6, a second embodiment of the present invention is shown wherein the subocean bottom explosive seismic source 600 is implanted, under the teachings of the present invention, and is connected over cable 30 to signal buoy 40 which contains a blaster receiver unit 610. As before, the buoy 40 is anchored over cable 50 to an anchor 60.

In this arrangement, the seismic source 600 is detonated and generates seismic signals 620 which are reflected off substrata 120. The seismic signals are detected by a receiver 630 which is pulled with a signal cable 640 by a boat 650. The boat 650 contains an electronic control 660 which transmits a signal to the blaster unit 610 to selectively detonate the seismic source 600. Each blaster unit 610 is uniquely coded to receive only its activation signal. Hence, the control electronics 660 can selectively detonate any particular seismic source 600.

Figure 7:
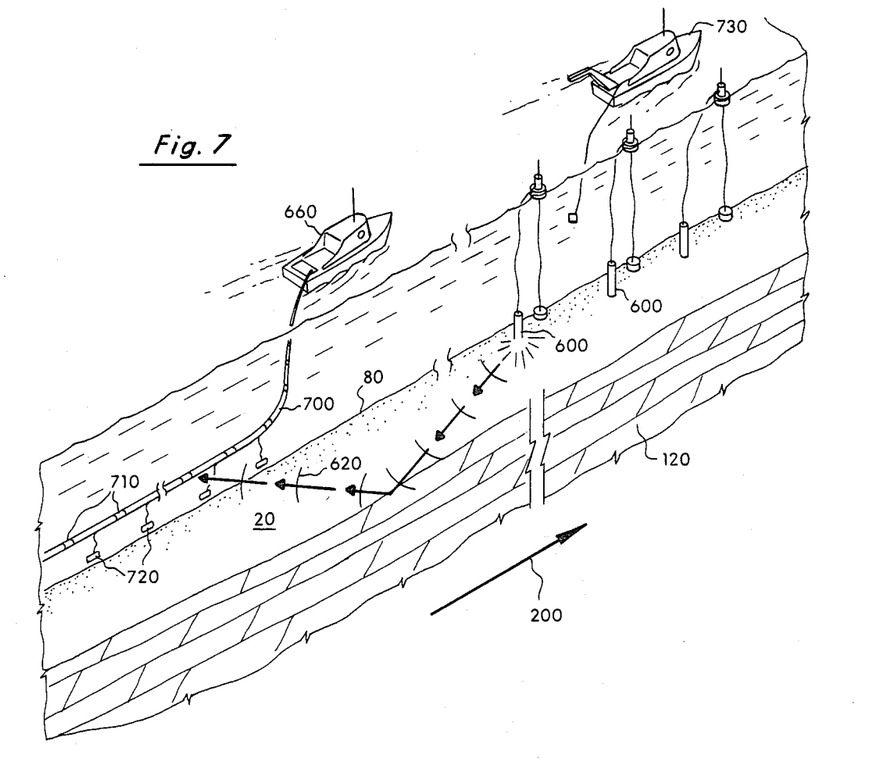
FIG. 7 sets forth the second embodiment of FIG. 6 showing a number of implanted seismic sources along a recording line.

In FIG. 7 is shown vessel 660 pulling a drag cable 700 which could be as long as five miles and containing a number of seismic detectors 710. Such drag cables could carry up to 96 seismic detectors. Drag cable 700 is weighted to the bottom by a number of weights 720. The boat 660 pulls the drag cable 600 along the recording line 200.

In this operation, three boats will be necessary. The first boat, not shown, would be the crane boat such as the type shown in FIG. 2 which selectively implants the seismic sources 600 at approximately 50 to 300 foot intervals along the recording line under the teachings as priorly discussed. A second boat 730 retrieves the buoys and anchors after the seismic sources 600 have been detonated. Therefore, the first boat selectively implants the seismic sources 600 along the recording line 200, the second boat 730 selectively removes the buoys and anchors associated with detonated seismic sources 600 and the third boat 660 pulls the drag cable 700 and selectively causes the detonation of the seismic sources 600.

This technique enables the implanting of the seismic sources 600 to be precisely placed on the ocean bottom in accordance with a planned survey technique. The detonation of the seismic source 600 is controlled at boat 660 and can be precisely detonated in time. By implanting the seismic source 600 below the mudline, 20 to 30 feet into the sediment 20, the seismic signals are stronger and more distinct. In other words, the soft sediment does not antenuate the seismic signals as would occur if the seismic signal occurred above the floor bottom.

DETAILED DESCRIPTION OF SECOND PREFERRED EMBODIMENT

Figure 8:
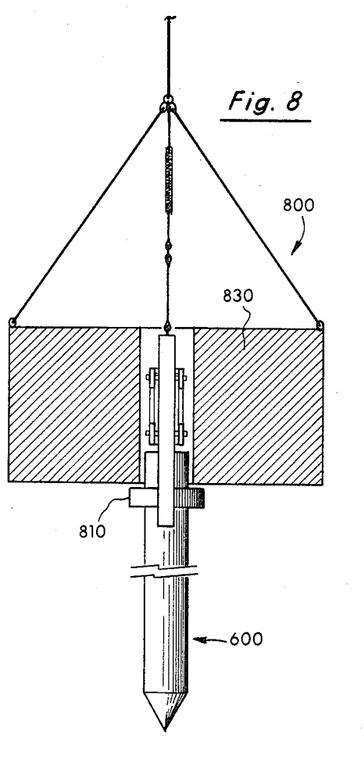
FIG. 8 sets forth, in partial cross-section, a planting unit and a seismic source of the second embodiment.
Figure 9:
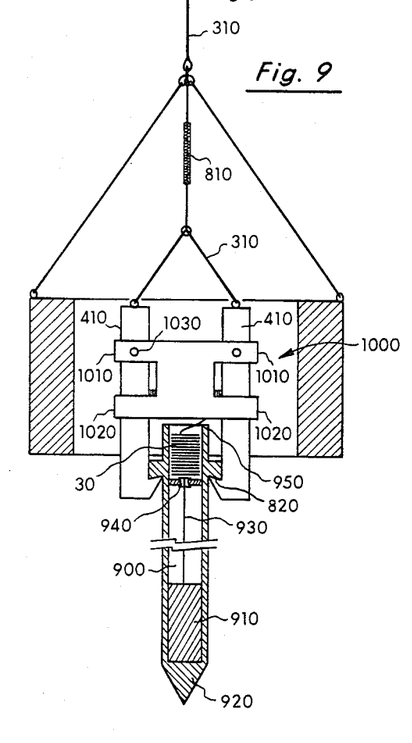
FIG. 9 sets forth in partial cross-section the planting unit and seismic source of the second embodiment.
Figure 10:
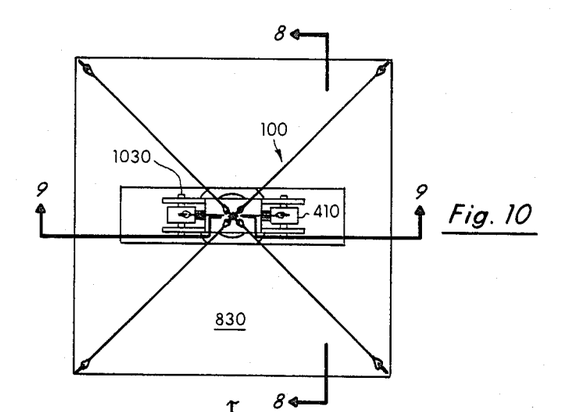
FIG. 10 is a top planar view of the planting unit and seismic source of the second embodiment.

In FIGS. 8 through 10 are set forth the details of the planting unit 800 for the seismic source 600. The seismic source 600 is comprised, in the preferred embodiment, of a tube 900 of polyvinyl chloride material having a hollowed center 905, as shown in FIG. 9, and having an explosive charge 910 placed in the bottom of the tube and above a cone-shaped insertion point 920. A detonator wire 930 is conventionally interconnected with the explosive material 910 which in the preferred embodiment is a gel-like material such as DuPont Marine TOVEX. At the top end of the tube 900 is formed a cylindrical chamber 950 which contains the signal wire 30 which carries the detonation signal.

In the preferred embodiment, approximately 600 feet of signal wire 30 is stored in chamber 950. Chamber 950, in comparison with the chamber of container 360 in FIG. 3, can be much smaller in size in that the stress cable need is not utilized and only a single wire need be present for carrying the detonation signal. Disposed around the tube 900 at the upper end is a collar 810, which has a lower surface 820 tapered inwardly and outwardly to form a catch surface. As before, the holding arm selectively engages the catch surface 820 to hold the seismic source 600 while it is being lowered into the ocean and implanted into the ocean bottom.

The planting unit 800 includes a weight 830 which is disposed around a holding arm 410. The support cable 310 engages the corners of the weight 830 and also engages through a spring 840 at the top of the release arms 410.

Figure 11:
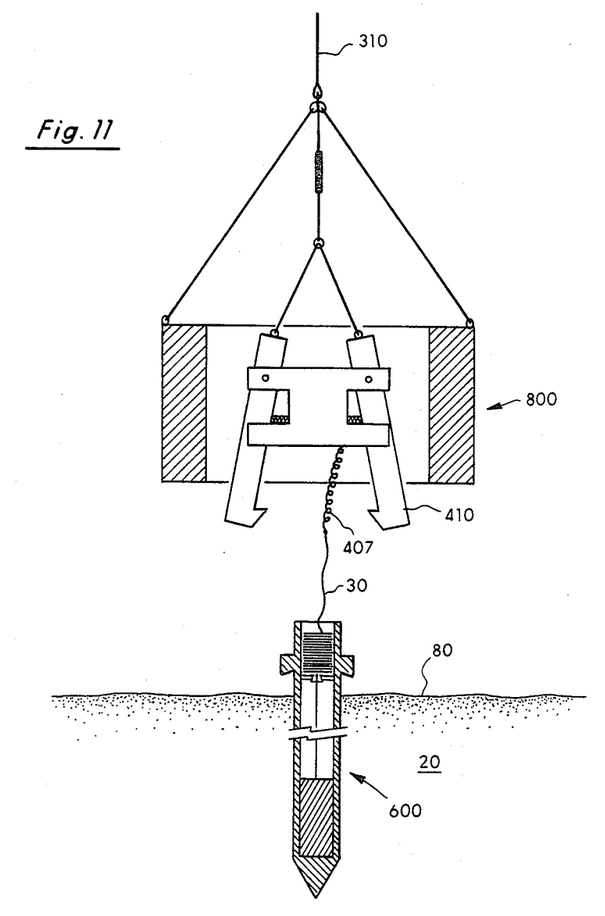
FIG. 11 sets forth in partial cross-section the release of the planting unit from the seismic source of the second embodiment.

As shown in FIG. 11, after the seismic source 600 is implanted into the ocean sediment below mudline, the support cable 310 goes slack causing the holding arms 410 to open outwardly and release from the implanted seismic source 600. As before, as the planting unit 800 is returned to the crane boat 210, the detonator or signal wire 30 is pulled upwardly for attachment to the buoy 40.

The release mechanism 1000 of the preferred embodiment will now be discussed in reference to FIGS. 8 through 10. The release mechanism 1000 includes a pair of holding arms 410 where each holding arm 410 is pivotally mounted between a pair of guides 210 and 1020. A holding arm 410 is pivotally connected at pin 1030 between the upper pair of support brackets 1010. The lower pair of guides 1020 serve to align the support arms 410 and also to contain the release spring 400.

The two embodiments of the present invention (shown in FIG. 1 and FIG. 6, are really corollary embodiments in that the first embodiment uses an implanted seismic detector with a towed seismic source whereas the second embodiment uses an implanted seismic source with a towed seismic detector. Hence, under the teachings of the present invention, and with reference to FIG. 1, a first seismic device 10 (i.e., detector or source) is implanted into the subocean bottom and is interconnected to a first communication unit 70 which is part of the buoy 40. A second seismic device (i.e., source or detector) 100 is carried by boat 90 in a predetermined pattern near the first implanted seismic device 10. A second communication unit 130 on boat 90 communicates with both the second seismic device and communicates with the first communication unit. In this arrangement, seismic signals are delivered between the first seismic device 10 and the second seismic device 100.

It is to be expressly understood that modifications to the structure set forth in the two embodiments could be made which modifications will still fall within the teachings of the present invention as set forth in the following claims.

We claim:

1. A system utilized with a boat 210 for suboceanic seismic exploration of the earth formations (20) beneath the ocean bottom (80), said system comprising:
at least one subocean bottom seismic apparatus (10), said apparatus comprising:
(a) a seismic device (340),
(b) an elongated tube (330) for internally holding said seismic device (340) near the bottom end of said tube (330),
(c) a container (360) connected to the upper end of said tube (330),
(d) a signal cable (30) coiled in said container (360), said signal cable (30) electrically connected to said seismic device (340), and
(e) a plurality of catches (367) mounted on the sides of said container (360),
a weighted planting unit (300) selectively engaging said seismic apparatus (10) and having sufficient weight (320) for planting said tube (330) vertically into said ocean bottom (20) as said planting unit (300) is lowered, said weighted planting unit comprising:
holding arms (410) on said planting unit (300) and operatively engaging said catches (367) when said planting unit and said apparatus are lowered, and
means (400) operative on said holding arms (410) for releasing said holding arms (410) from said catches (367) after said apparatus (10) has been implanted beneath said oceam bottom (80), and
means (220) on said boat (210) for lowering said planting unit (300) attached to said apparatus (10) into said ocean thereby planting said apparatus (10) into said ocean bottom (80) so that said planting unit automatically releases from said apparatus (10) after implantation, said lowering means (220) being further capable of raising said planting unit (300) and signal cable after said release to the surface of said ocean, said apparatus (10) also being capable of being retrieved from said ocean bottom by said lowering means through selective connection to said signal cable.

2. A system utilized with a boat (210) for suboceanic seismic exploration of the earth formations (20) beneath the ocean bottom (80), said system comprising:
at least one subocean bottom seismic apparatus (10), said apparatus comprising:
(a) a seismic device (340),
(b) an elongated tube (330) for internally holding said seismic device (340) near the bottom end of said tube (330),
(c) a container (360) connected to said tube (330), and
(d) a signal cable (30) coiled in said container (360), said signal cable (30) electrically connected to said seismic device (340),
a weighted planting unit (300) selectively engaging each of said seismic apparatuses (10) and having sufficient weight (320) for planting said tube (330) vertically into said ocean bottom (20) as said planting unit (300) is lowered, said weighted planting unit comprising:
holding arms (410) on said planting unit (300) and operatively engaging said apparatus (10) when said planting unit and said apparatus (10) are lowered, and
means (400) operative on said holding arms (410) for releasing said holding arms (410) from said apparatus (10) after said apparatus (10) has been implanted beneath said ocean bottom (80), and
means (220) on said boat (210) for lowering said planting unit (300) attached to said apparatus (10) into said ocean thereby planting said apparatus (10) into said ocean bottom (80) so that said planting unit automatically releases from said apparatus (10) after implantation, said lowering means (220) being further capable of raising said planting unit (300) and signal cable after said release to the surface of said ocean, said apparatus (10) also being capable of being retrieved from said ocean bottom by said lowering means through selective connection to said signal cable.

3. A system utilized with a boat (210) for suboceanic seismic exploration of the earth formations (20) beneath the ocean bottom (80), said system comprising:
a plurality of subocean bottom seismic apparatuses (10), each of said apparatus comprising:
  (a) a seismic device (340),
  (b) an elongated tube (330) for internally holding said seismic device (340) in said tube (330),
  (c) a container (360) connected to said tube (330), and
  (d) a signal cable (30) coiled in said container (360), said signal cable (30) electrically connected to said seismic device (340),
a weighted planting unit (300) selectively engaging around each of said seismic apparatuses (10) and having sufficient weight (320) for planting each said tube (330) vertically into said ocean bottom (20) as said planting unit (300) is lowered, said weighted planting unit comprising:
  means (410) on said planting unit (300) and operatively engaging around said apparatus (10) when said planting unit and said apparatus (10) are lowered, and
  means (400) operative on said engaging means (410) for releasing said engaging means (410) from said apparatus (10) after said apparatus (10) has been implanted beneath said ocean bottom (80), and
means (220) on said boat (210) for lowering said planting unit (300) attached to said apparatus (10) into said ocean thereby planting said apparatus (10) into said ocean bottom (80) so that said planting unit automatically releases from said apparatus (10) after implantation, said lowering means (220) being further capable of raising said planting unit (300) and signal cable after said release to the surface of said ocean, for selective attachment to the next apparatus (10) for implantation.

* * * * *